United States Patent

[11] 3,575,621

| [72] | Inventors | Elmo Voland;<br>Benjamin F. Chestnut; Peter H. Gerhardt;<br>Richard E. Pervorse, Indianapolis, Ind. |
|---|---|---|
| [21] | Appl. No. | 803,213 |
| [22] | Filed | Feb. 28, 1969 |
| [45] | Patented | Apr. 20, 1971 |
| [73] | Assignee | P. R. Mallory & Co., Inc.<br>Indianapolis, Ind. |

[54] DRIVE MEANS FOR APPLIANCE CONTROL MEANS
12 Claims, 3 Drawing Figs.

[52] U.S. Cl. .................................................. 310/112,
310/83, 74/661, 318/8
[51] Int. Cl. .................................................. H02k 7/20
[50] Field of Search .......................................... 310/112,
114, 83, 101; 307/120, 123, 124, 133; 74/113,
661, 665 (A&B); 318/8

[56] References Cited
UNITED STATES PATENTS

| 2,180,599 | 11/1939 | Menasco ...................... | 74/661X |
| 2,573,011 | 10/1951 | Gruber ......................... | 318/8 |
| 3,168,665 | 2/1965 | Holper ......................... | 310/112 |
| 3,290,963 | 12/1966 | Oldfield et al. ................ | 74/661X |

*Primary Examiner*—D. X. Sliney
*Attorneys*—Richard H. Childress, Robert F. Meyer and Henry W. Cummings ABSTRACT: At least two motor drive means drives a control means for an appliance, each of the motor drive means including a speed reducing means coupled to a common output means which in turn is coupled to the control means.

PATENTED APR20 1971 3,575,621
FIG.1
FIG.2
FIG.3
INVENTORS
ELMO W. VOLAND
BENJAMIN F. CHESTNUT
PETER H. GERHARDT
RICHARD E. PERVORSE
BY Robert J Meyer
ATTORNEY
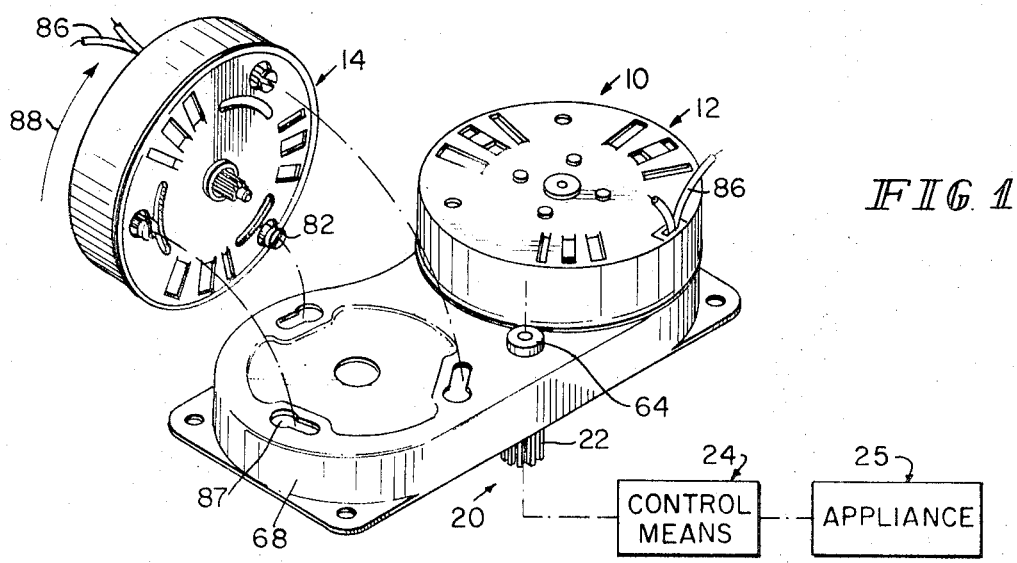
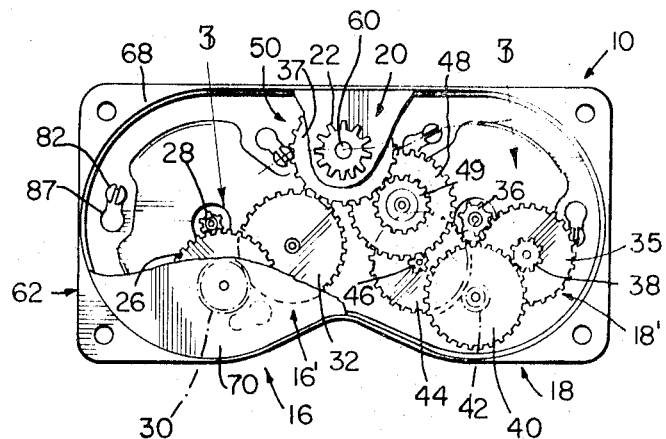
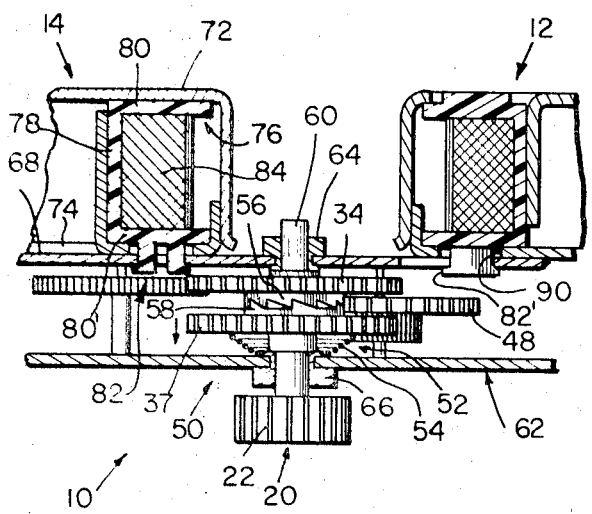

DRIVE MEANS FOR APPLIANCE CONTROL MEANS

The present invention relates to a driving means for driving the control means of appliances. More particularly, it relates to a driving means used in appliances which require that the control means for the appliance be driven at separate speeds.

In the remote control means for televisions, for example, a volume control may need to be adjusted at one speed while the channel selector may be operable at a different speed. As another example, in appliances such as washers and dryers, timing mechanisms are used to operate the appliance in accordance with a programmed sequence. Such a timer includes a control means such as a camstack wherein the programmed sequences are "built-in" to the intelligence of the cams. This camstack is driven at a certain speed to carry out the programmed sequence. In recent years, because of the large number of operations required in the appliance, such a timer usually included a rapid advance means to rapidly advance the camstack to a desired starting point. This usually requires a driving means to drive the camstack at a speed faster than its normal operational speed. As another example, some appliances, such as certain washers, require a long rinse cycle. When this is required, a "slow" advance means may be used in place of the rapid advance.

Prior to this invention, the separate driving means for the control means of timers were coupled to the control means in a manner, such as for example, by escapement mechanisms, such that the timer became very complicated, and as a result, the timers were relatively large and bulky. In addition, the cost of such mechanisms is becoming increasingly great. In general, the same can be said in timers which utilize a solenoid to operate the rapid advance.

The present invention is concerned with a driving means which drives the control means of an appliance which when used in combination with the control means has as an object the provision of a unit which is simple, compact and relatively inexpensive.

Another object of the invention is to provide a driving means for the control means of an appliance which utilizes at least two motor drive means each having a speed reducing means coupled to a common output means.

Another object of the invention is to provide a driving means for a control means for an appliance wherein one of the driving means is continuously operated during the operation of the control means while the other motor driving means is selectively operated during the operation of the control means.

Yet another object of the invention is to provide a driving means for a control means of an appliance having two motor drive means disposed in juxtaposition on a housing means in which two speed reducing means each coupled to one of the motor means is disposed.

Another object of the invention is to provide a driving means for a control means of an appliance wherein at least two motor means are coupled to a common output means, the motor means each having a speed reducing means including a clutch means.

Yet another object of the invention is to provide a driving means for driving the control means of an appliance wherein there are at least two motor drive means coupled to a single output means through a spring biased clutch means carried by the output means.

Still another object of the invention is to provide the combination of an appliance, a control means, and at least two motor drive means driving the control means through a common output means.

Still another object of the invention is to provide the combination of an appliance, a control means including cam programming means, and two motor drive means driving the cam programming means through a common output means with one of the motor means continuously being energized during the operation of the cam programming means, and the other of the motors being selectively energized to rapidly or slowly advance the cam programming means.

These and other objects and the nature thereof will become apparent from the following description given in conjunction with the accompanying drawings wherein like reference numbers describe elements of a similar function.

In the drawings:

FIG. 1 is an isometric view of the drive means of the present invention;

FIG. 2 is a bottom elevation, with portions being removed, of the drive means of FIG. 1;

FIG. 3 is a partial section taken along the line 3–3 of FIG. 2.

Generally speaking, the objects of the invention are accomplished by providing a drive means which includes at least two motor means, each of the motor means including a speed reducing means coupled thereto, and clutch means selectively coupling the speed reducing means to a common output means. Further, the invention contemplates the combination of an appliance, a control means selectively operating the appliance and at least two motor drive means driving the control means, each of the motor drive means having a speed reducing means coupled thereto, the speed reducing means coupled to a common output means which in turn is coupled to the control means, the speed reducing means including a clutch means selectively coupling the motor means with the common output means.

Referring now to the drawings, there is shown a driving means 10 which includes at least two motor drive means 12 and 14 each of which are coupled to a speed reducing means 16 and 18. Each of the motor means 12 and 14 drives a common output means 20 through their respective speed reducing means. Output means 20 includes pinion 22. The output means 20 is coupled to a control means 24 which in turn drives or controls the operation of an appliance 25. Such control means and appliance could include, for example, a means to regulate the volume or the channel selector means of a television unit. Or, as another example, control means 24 could include a timer in an appliance such as a washer or dryer. In the latter application, the camstack of such timer needs to be operated through its normal operating cycle and in addition, may need to include a rapid advance means to advance the camstack rapidly to a predetermined starting point. Such timers are known in the art and will not be discussed in detail in the present application. In such application, the use of the two motor means 12 and 14 is used to drive the common output means 20 at different speeds in accordance with the predetermined requirements of the control means 24. While the invention will be described with reference to operating a control means at two different speeds, it should be understood that the invention need not be so limited, and that the motor means 12 and 14 could be driven at the same speed simultaneously to provide a higher torque output from the output means 20.

With reference to FIG. 2, speed reducing means 16 and 18 each include a gear train means 16' and 18'. Gear train means 16' and 18' include various gears and pinions normally used in speed reducing means. As shown in the present embodiment, gear train means 16' includes gear 26 which is driven by motor pinion 28. Pinion 30, which is concentric with and coupled to gear 26, drives gear 32 which in turn drives gear 34 (FIG. 3). Gear 34 is concentric with and coupled to pinion 22 of output means 20. Gear train means 18' includes a gear 35 which is driven by motor pinion 36. Pinion 38, which is concentric with and coupled to gear 35, drives gear 40. Pinion 42 which is coupled to and concentric with gear 40 drives gear 44. Pinion 46, which is concentric with and coupled to gear 44, drives gear 48 which is coupled to pinion 49 which drives gear 37 which in turn drives pinion 22 of output means 20. In the present embodiment, gear train means 16' will give a speed reduction of 24:1, while gear train means 18' will give a speed reduction of 1440:1.

Referring specifically to FIG. 3, the speed reducing means also includes a clutch means 50 which includes a spring biased ratchet means 52. Spring biased ratchet means 52 includes a coil spring 54 and ratchets 56 and 58. Output means 20, gears 34 and 37 and clutch means 50 are carried by a shaft means 60 which is rotatably journaled in housing means 62 through bushings 64 and 66. Ratchet teeth 58 with its cooperating gear 37 are fixedly held to shaft means 60, while ratchet teeth 56 with its cooperating gear 34 are carried rotationally dependent of shaft means 60.

Motors 12 and 14 may be of the synchronous motor type. They are mounted in juxtaposition on cover means 68 of housing means 62 which carries the speed reducing means 16 and 18. Output means 20 extends through cover plate 70 opposite the motors 12 and 14. With this arrangement, as is particularly shown in FIG. 1, the drive means of the present invention is neat, compact with a relatively small amount of mechanical linkages.

A synchronous motor that is particularly useful in the present drive means is described in U.S. Pat. No. 3,427,485 issued Feb. 11, 1969.

With particular reference to FIG. 3, a portion of such synchronous motors are shown. The motor includes shells 72 and 74 in which a molded bobbin means 76 is engaged. It should be understood that, as described in the above-referenced patent, the motor would also include rotor poles and stator poles, rotational directional means, and other necessary elements. The molded bobbin 76 is comprised of an annular tubular section 78 terminating in flanges 80 and 80', and integral mounting stud or leg means 82 equally spaced about a flange 80' and projecting therefrom. The bobbin may be fabricated from thermoplastic-type resins and plastics such as nylon and the like. A field coil 84 is wound on the bobbin means 76, and includes leads 86 projecting through the shell 72 of the motor. The stud means 82 has a double D-shaped cross section to facilitate subsequent locking thereof with the underside of the housing means 62 of the speed reducing means. The shape of the stud means 82 is such as to afford smooth entry of the stud into keyhole-shaped apertures 87 formed in housing means 62. The stud means 82 interfits with the reduced portion of the keyhole-shaped aperture upon the application of a moderate pressure which arcuately displaces the motor with respect to the housing means 62 as shown by arrow 88. The leading edge of each stud means includes a flange or shoulder portion 82' which projects through cooperatively associated apertures 90 of shell 74. Upon exit of the leading edge of the stud means through the cooperatively associated aperture in the housing 62, the stud will expand to its normal position and the flange edge will engage the underside of the housing thereby effectively locking the motor to the speed reducing means. More specifically, the motor pinions 28 or 36 (FIG. 2) will be in alignment with and engaged with gear means 26 or 35 of the speed reducing means. This feature of having the mounting means integral with the bobbin of the motor such that when the motor is mounted on the speed reducing means, permits exact alignment between the motor means and the speed reducing means to be automatically achieved, and enables the drive means to be neat, compact and very efficiently constructed.

In describing the operation of the present drive means, assume that the drive means is being utilized in a timer having a camstack driven at a constant rate of speed by motor means 12, for example. Motor means 14 could then be used to drive the rapid advance means of the timer. While both motors will be turning, motor 12 will be continuously energized, while motor 14 will only be energized during the operation of the rapid advance. Such selective energization of motor 14 will be controlled through the intelligence of the camstack. When the camstack is being driven at normal operational speeds, ratchet means 50 will be engaged and both motors will be turning. When the motor 14 is energized to rapidly advance the camstack, ratchet means 50 will be disengaged due to ratchet 56 overriding ratchet 58. Thus the two motors can be independently operated at the required different speeds.

Thus there is described a driving means which includes at least two motor means each having a separate speed reducing means coupled to a single output means for driving the control means of an appliance, the novel features of which are set forth in the appended claims.

We claim:

1. In combination, an appliance, a control means selectively operating said appliance, said control means including cam programming means, two motor drive means driving said cam programming means through a common output means coupled to said drive means, one of said motor means continuously energized during the operation of said cam programming means, the other of said motors selectively energized to rapidly advance said cam programming means during said operation.

2. The combination according to claim 1 wherein said motor drive means includes synchronous motors.

3. The combination according to claim 1, further including separate speed reducing means each cooperatively associated with one of said motor drive means disposed within a housing means and wherein said common output means extends through said housing means on one side thereof, and said two motor drive means are disposed in juxtaposition on said housing means.

4. The combination according to claim 3 wherein said speed reducing means includes clutch means selectively coupling said two motor means with said output means.

5. The combination according to claim 4 wherein said clutch means is carried by said common output means.

6. In combination, an appliance, a control means selectively operating said appliance, said control means including cam programming means, two motor drive means driving said cam programming means through a common output means coupled to said drive means, one of said motor means continuously energized during the operation of said cam programming means, the other of said motors selectively energized to rapidly advance said cam programming means.

7. The combination according to claim 6 wherein said motor drive means includes synchronous motors.

8. The combination according to claim 6 further including separate speed reducing means each cooperatively associated with one of said motor drive means disposed within a housing means and wherein said common output means extends through said housing means on one side thereof, and said two motor drive means are disposed in juxtaposition on said housing means.

9. The combination according to claim 8 wherein said speed reducing means includes clutch means selectively coupling said two motor means with said output means.

10. The combination according to claim 9 wherein said clutch means is carried by said common output means.

11. In combination, an appliance, a control means selectively operating said appliance, and two synchronous motors driving said control means and disposed in juxtaposition on a housing means each of said motors having a speed reducing means disposed within said housing means and coupled thereto, said speed reducing means coupled to a common output means coupled to said control means and extending through said housing means on one side thereof, said speed reducing means including a clutch means selectively coupling said motors with said common output means, and wherein said speed reducing means includes a gear train means enclosed in said housing means, said motors each including a wire wound enclosure comprised of a tubular section terminating in flanges and resilient stud means integrally formed with one of said flanges and extending therefrom, said housing means including apertures corresponding to said stud means, said stud means having flanged portion that extends beyond the corresponding aperture in said housing means, each of said stud means being adapted to be received in said corresponding aperture in said housing means and engaging with said housing means in locking relationship thereby effectively securing said gear train means to said synchronous motor so that the pinions of said synchronous motors are predeterminately and automatically aligned and cooperatively associated with the input gear of each of said gear trains.

12. A drive means comprising at least two motor means disposed in juxtaposition on a housing means, each of said motor means having a speed reducing means disposed within said housing means and coupled thereto, and clutch means selectively coupling said speed reducing means to a common output means extending through said housing means, said speed reducing means including a gear train means enclosed in said housing means, said motor means including synchronous motors each including a wire wound enclosure comprised of a tubular section terminating in flanges and resilient stud means integrally formed with one of said flanges and extending therefrom, said housing means including apertures corresponding to said stud means, said stud means having a flanged portion that extends beyond the corresponding aperture in said housing means, each of said stud means being adapted to be received in said corresponding aperture in said housing means and engaging with said housing means in locking relationship thereby effectively securing said gear train means to said synchronous motors so that the pinions of said synchronous motors are predeterminately and automatically aligned and cooperatively associated with the input gear of each of said gear trains.